Sept. 24, 1929.  S. G. MARGLES ET AL  1,729,079
SAFETY DEVICE FOR CONVEYERS
Filed April 21, 1924
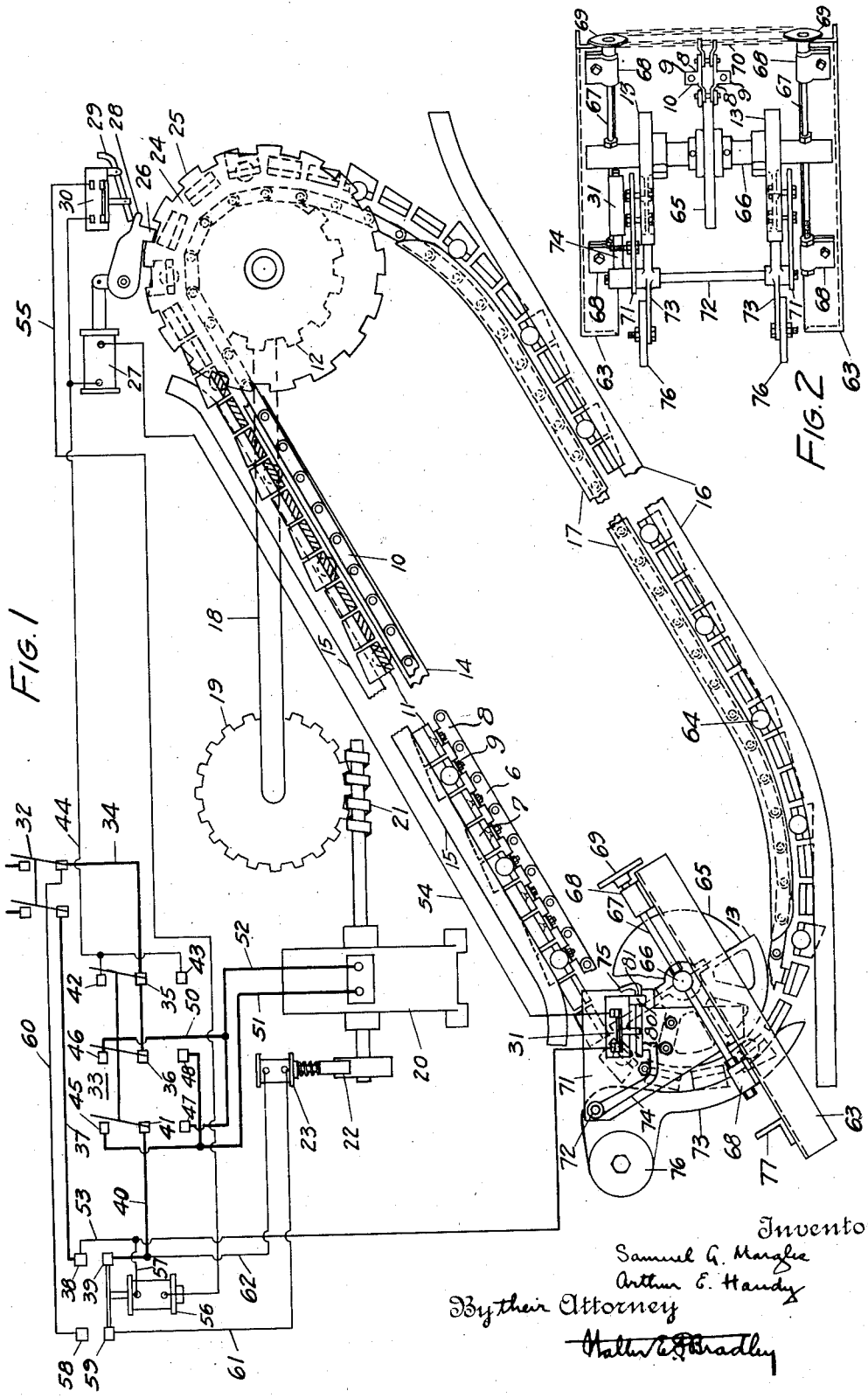
Inventors
Samuel G. Margles
Arthur E. Handy
By their Attorney
Walter E. Bradley Patented Sept. 24, 1929

1,729,079

UNITED STATES PATENT OFFICE

SAMUEL G. MARGLES, OF BROOKLYN, AND ARTHUR E. HANDY, OF LYNBROOK, NEW YORK, ASSIGNORS TO OTIS ELEVATOR COMPANY, OF JERSEY CITY, NEW JERSEY, A CORPORATION OF NEW JERSEY

SAFETY DEVICE FOR CONVEYERS

Application filed April 21, 1924. Serial No. 708,043.

This invention relates to inclined conveyers such as moving stairways, and particularly to safety devices for use in conjunction with such conveyers for stopping the conveyer and the driving motor therefor, and for preventing the conveyer belt from buckling and sliding down in the event that the belt is broken.

An object of the invention is to prevent buckling of the conveyer belt by providing a guiding system for the running gear of the conveyer; as hereinafter set forth this is formed by sets of track upon which the running gear is supported and other sets of track for guiding the running gear, with the tracks extending substantially throughout the path of the belt along both upper and return sides.

A further object of the invention is to provide a safety device to be actuated by the running gear to stop the conveyer when the belt is broken; said device being independent of the supporting track for the running gear.

In the accompanying drawing,

Figure 1 is a side view partly in section showing a conveyer with a safety device in accordance with this invention together with a diagrammatic representation of the drives and electrical connections, and Figure 2 is a detail plan view of supporting and tensioning apparatus for the lower carriage of the conveyer.

Referring a Figure 1, the belt 6 of the conveyer, sometimes referred to as the tread belt, is illustrated as comprising a series of transverse slats or cleats 11 and a chain 10 to which the cleats are secured. The cleats may be secured to the chain in any suitable manner, as by means of bolts extending through lugs 9 formed on the chain links 8. Each cleat is provided with a series of tread pieces 7. The cleats are illustrated as arranged in groups of three with the tread pieces of one cleat of a group of different height from those of another cleat. The tops of the tread pieces of a group are sloped in such manner as to form a continuous tread surface. The effect of this construction is to produce a tread-belt, the general character of which is in the form of steps of sufficient width to accommodate an ordinary adult human foot when placed in a position at right angles to the direction of the cleats. The chain 10 passes over the driving sprocket 12 at its upper end and an idler 65 at its lower end. The running gear for the belt is illustrated as comprising a plurality of rollers 64 and suitable attaching means (not illustrated) by which the belt is secured to the rollers. The rollers may be arranged at intervals along the belt, as at every third cleat as illustrated. Rollers are provided on each side of the belt, as illustrated for the upper portion of the belt, i. e., that portion of the belt which is being drawn upwardly by the sprocket 12 during the ascending operation of the conveyer, those on one side being shown in connection with the top part of the upper portion of the belt and those on the other side being shown in connection with the lower part of the upper portion of the belt. There are two carriage members 13 over which the rollers pass at the lower end of the conveyer, one for the rollers on one side of the belt and the other for the rollers on the other side of the belt. The running gear for the upper portion of the belt is supported by tracks 14. These tracks extend upwardly from the carriage members 13, forming an incline. In order that certain structural details may be readily seen, only a portion of one of these tracks is illustrated. In a similar manner, the running gear for the lower portion of the belt is supported by tracks 16. Tracks 15 are arranged above tracks 14 and tracks 17 above tracks 16, being spaced therefrom sufficiently to permit operation of the rollers. The tracks arranged in this manner constitute a guiding system which prevents displacement of the running gear.

The driving mechanism for the conveyer comprises the driving sprocket 12 secured on shaft 18 which is provided with a worm wheel 19. The mechanism is operated by an electric motor 20 having a worm 21 on its shaft which meshes with the worm wheel 19 in a driving relation therewith.

The electric motor 20 is provided with brake mechanism 22 which is disclosed as being operated by the electromagnetic means 23. A brake is also provided for operating directly upon the conveyer comprising the brake drum 24 secured to the shaft 18 and having teeth 25 adapted to be engaged by a detent 26, shown in engagement for holding the driving sprocket and conveyer belt from moving. This detent 26 is provided with a magnetic solenoid 27 for withdrawing it from the brake drum 24 and has a projection 28 which engages a lever 29 in a manner so as to close the circuit through a switch 30 when the detent is raised to its retracted position.

A switch 31 operated in conjunction with the safety device is mounted on one of the carriage members 13 and is in the electric control circuit for the driving motor.

The operation of the apparatus is as follows: Upon closing the supply switch 32 and the reversing switch 33 the electromagnet 27 is energized so as to retract detent 26 and close the contacts of switch 30. Assuming the blades of the reversing switch to be closed on the upper set of contacts for operating the conveyer in one direction, the closing of these switches, 32 and 33, completes the circuit by wire 34 to switch 33, from contacts 35 to 42, by wire 44 to the electromagnet 27, thence by wire 54 through switch 31, the contacts of which are assumed to be closed, by wire 53, contact 38, and wire 37 to the supply.

The closing of the contacts of switch 30 energizes the electromagnet 56 which closes the contacts 38 and 39 and the contacts 58 and 59 so as to energize electromagnet 23 for releasing the brake 22 as motor 20 starts to operate. The circuits for this part of the operation are as follows: The circuit from wire 34 to wire 44 continues through contacts of switch 30, by wire 55 to electromagnet 56, by wires 57 and 53, contact 38 and wire 37 to the supply. Closing of contacts 38 and 39 completes the circuit by wire 34, through contacts 35, 36 and 46 of switch 33, by wires 50 and 52 to motor 20, thence by wire 51, through contacts 45 and 41, by wire 40, through contacts 39 and 38, by wire 37 to the source. Contacts 58 and 59 at the same time complete the circuit by wire 60, through these contacts, 58 and 59, by wire 61, to electromagnet 23, thence by wire 62, through contacts 39 and 38 and by wire 37 to the source.

Operation of the conveyer in the reverse direction will obviously be accomplished by throwing the blades of the reversing switch 33 down upon the lower set of contacts 47, 48 and 43, which will complete the circuit through electromagnet 27 substantially in the same manner as before, and supply current for the motor by wires 51 and 52 in the reverse direction. The connections with the field of the motor are omitted.

The members of switch 33 have been diagrammatically represented as a triple-pole double throw switch including reversing connections for the motor 20 and switches for various electromagnetic operating mechanisms; it will readily be seen that any desired type of switch equipment may be resorted to in conjunction with the conveyer for performing the function as herein set forth.

In the event that the contacts of switch 31 should be separated, that is if the conveyer belt should be broken so as to cause the separation of these contacts, the circuit through electromagnet 27 is immediately broken, the detent 26 goes into engagement with drum 24, contacts of switch 30 are separated, thereby deenergizing electromagnet 56 so as to separate contacts 38 and 39 and contacts 58 and 59 thus breaking the circuit to the motor 20 and deenergizing the electromagnet 23 so as to apply the brake 22 on the motor drive shaft.

The carriage is movably supported on inclined frames 63. In the plan view, Figure 2, the carriage members 13 over which the rollers 64 pass and an idler 65 for the chain 10, are shown mounted on a horizontal shaft 66. This shaft is supported on a pair of adjusting screws 67, one passing through each end of the shaft 66 and each supported on the frames 63 by means of pairs of journal members 68. On the upper ends of each of the screws 67 are sprockets 69 which are connected with a chain 70 whereby the two screws may be simultaneously turned for adjusting the position of the carriage for varying the tension upon the conveyer chain.

The safety device supported on the carriage is for the purpose of stopping the driving mechanisms as before mentioned by opening switch 31 in the event of a break in the conveyer belt. For this purpose a plate 71 is secured to one of the carriage members 13 and another plate 71 is similarly secured to the other carriage member. These plates rotatably support a shaft 72. Upon this shaft are fastened arms 73 and a switch lever 74 which engages an arm of a switch lever 75 of switch 31 for normally holding it closed. The switch lever 75 is pivotally supported at 80 by a projection 81 depending from the switch, the switch being mounted on one of the plates 71.

The arms 73 are counterweighted by means of weights 76 which keep the arms closely adjacent to the rollers 64, and they remain in such position except when the belt is broken when movement of the belt will force the rollers 64 outwardly against the arms 73.

The outward movement of these arms causes the clockwise rotation of arm 74, as viewed in Figure 1, releasing the switch lever 75 to permit the separation of the contacts of switch 31. The separation of these contacts results in shutting off the power supply, applying the emergency brake and also brake 22 on the motor, as above set forth.

As previously noted, a guiding system is provided for the running gear of the conveyer between the driving sprocket 12 and the carriage comprising the pairs of tracks 14 and 15 and 16 and 17, tracks 14 and 16 of which are supporting tracks of the incline and return sides respectively, and tracks 15 and 17 are up-thrust members. These up-thrust members prevent the belt from buckling when a break occurs. Thus, with the buckling of the belt prevented, the operation of the safety device upon the breaking of the belt or upon slack developing therein is assured. An angle 77 is secured to the frames 63 to arrest the motion of the arms 73.

What is claimed is:—

1. A conveyer comprising, a belt, driving mechanism for the belt, running gear attached to the belt, tracks for supporting said running gear, a movable member positioned to be normally disengaged from said running gear but to be engaged and moved thereby upon the belt becoming slack, and means operated as a result of said movement of said member for causing the stopping of the driving mechanism.

2. An inclined conveyer comprising, a belt, running gear attached to the belt, tracks for the running gear along the incline of the belt, a carriage at the lower end of the belt having carriage members over which the running gear passes, driving mechanism for the belt at the upper end thereof, and a safety device at the lower end of the belt arranged for actuation by the running gear, upon the running gear slackening away from a carriage member, to cause the stopping of said driving mechanism.

3. An inclined conveyer comprising, a belt, running gear attached to the belt, tracks for the running gear along the incline of the belt, a carriage for the running gear at the lower end of the belt, driving mechanism for the belt at the upper end thereof, a pivoted member adjacent the carriage, said pivoted member being positioned to be normally disengaged from the running gear but to be engaged and moved thereby about its pivot upon slack developing in the belt, and a switch operated as a result of said pivotal movement of said member to cause the stopping of said driving mechanism.

4. An inclined conveyer comprising, a belt, driving mechanism for the belt, running gear attached to the belt, a movable member at one end of the conveyer and outside of the running gear, said movable member being positioned to be normally disengaged from said running gear but to be engaged and moved thereby upon the belt breaking or becoming slack, track members for supporting the running gear and for preventing the buckling of the belt between the ends of the conveyer to insure the engagement of said movable member by said running gear upon the breaking of the belt or upon slack developing in the belt, and means operated as a result of said movement of said member for controlling the operation of the conveyer.

5. An inclined conveyer comprising, a belt, running gear attached to the belt, a carriage for the running gear at the lower end of the belt, driving mechanism for the belt at the upper end thereof, a movable member at the lower end of the belt and outside of the running gear, said movable member being positioned to be normally disengaged from said running gear but to be engaged and moved thereby upon the belt breaking or becoming slack, track members for supporting the running gear and for preventing the buckling of the belt between the driving mechanism and the carriage to insure the engagement of said movable member by said running gear upon the breaking of the belt or upon slack developing in the belt, and means operated as a result of said movement of said member to cause the stopping of said driving mechanism.

6. A conveyer comprising in combination, a belt passing over a driving member and a carriage, driving means for the conveyer, running gear attached to the belt, track members for supporting the running gear and preventing the buckling of the belt between the driving member and the carriage, a movable member outside of the running gear and adapted to be actuated thereby for controlling the operation of the conveyer, and a stop for limiting the outward movement of said movable member.

7. A conveyer comprising in combination, a belt, electrical driving means for the belt, running gear attached to the belt, a movably mounted carriage at one end of the conveyer, mechanism for moving the carriage to adjust the tension upon the belt, and a safety device mounted upon said carriage comprising a switch for controlling the circuit for said driving means and a pivotally mounted member normally acting to hold said switch closed, and operable to be displaced from its normal position by said running gear upon breaking of the belt to open said switch.

8. A conveyer comprising in combination, a belt passing over a driving member at one end and a carriage at the other, running gear attached to the belt, pairs of spaced tracks for the running gear of the upper side of the belt extending between the driving member and said carriage, similar pairs of spaced tracks for the running gear of the lower side of the belt between the driving member and carriage, a movable member outside of the running gear extending over the end of the carriage and conforming in shape therewith and adapted to be moved outwardly by said running gear, and means operable by the movement of said movable member for stopping the driving member.

In testimony whereof, we have signed our names to this specification.

SAMUEL G. MARGLES.
ARTHUR E. HANDY.